(12) United States Patent
Benjey

(10) Patent No.: US 6,854,492 B2
(45) Date of Patent: Feb. 15, 2005

(54) ELECTRICALLY CONTROLLED REFUELING VAPOR VENT SHUTOFF

(75) Inventor: Robert P. Benjey, Dexter, MI (US)

(73) Assignee: Eaton Corporation, Cleveland, OH (US)

(*) Notice: Subject to any disclaimer, the term of this patent is extended or adjusted under 35 U.S.C. 154(b) by 0 days.

(21) Appl. No.: 10/308,789

(22) Filed: Dec. 3, 2002

(65) Prior Publication Data

US 2004/0103952 A1 Jun. 3, 2004

(51) Int. Cl.[7] .............................................. B65B 31/00
(52) U.S. Cl. .......................... 141/198; 141/2; 141/52; 141/59; 141/308; 123/519; 137/588
(58) Field of Search ........................ 141/44–47, 50, 141/52, 59, 290, 302–308, 2, 94, 198; 137/587, 588; 123/516, 518–521

(56) References Cited

U.S. PATENT DOCUMENTS

| | | | |
|---|---|---|---|
| 4,887,578 A | 12/1989 | Woodcock et al. | ......... 123/519 |
| 5,054,528 A | 10/1991 | Saitoh | .......................... 141/59 |
| 5,263,511 A * | 11/1993 | Ohasi et al. | ................. 137/588 |
| 6,253,802 B1 * | 7/2001 | Enge | ............................ 141/59 |
| 6,269,803 B1 * | 8/2001 | Corkill | ....................... 123/520 |
| 2001/0025668 A1 | 10/2001 | Enge | ........................... 141/59 |

FOREIGN PATENT DOCUMENTS

| | | |
|---|---|---|
| DE | 199 01 080 | 7/2000 |
| DE | 199 56 931 | 5/2001 |

* cited by examiner

*Primary Examiner*—J. Casimer Jacyna
(74) *Attorney, Agent, or Firm*—Roger A. Johnston

(57) ABSTRACT

An electrically operated valve is connected in the vapor recirculation line from a float operated vent valve, or a direct vapor recirculation line from the tank top to the upper end of the tank filler tube. The electrically operated valve is actuated by an electronic controller (ECU) which receives a fuel level signal either from the float operated level sender or from a thermistor located in the tank adjacent the top wall of the tank.

12 Claims, 4 Drawing Sheets

ELECTRICALLY CONTROLLED REFUELING VAPOR VENT SHUTOFF

BACKGROUND OF THE INVENTION

The present invention relates to fuel vapor venting during refueling of a motor vehicle fuel tank from a discharge nozzle placed into a tank filler tube of the type having a mechanical seal about the nozzle. Present fuel tank refueling nozzles commonly include a vacuum actuated device which shuts off the nozzle upon starvation of the vent vapor recirculation line thereby creating a vacuum in the filler tube around the nozzle.

Heretofore, in filler tubes not having a mechanical seal about the nozzle, the fuel tank vapor system provided for recirculation of the fuel vapor to the filler tube by connection to the vent line to the system vapor storage canister. In other known systems the system storage canister is connected to a separate vent tap through the top wall of the tank with a rollover valve for preventing spill leakage of fuel. The system employing the recirculation vent tap into the line to the canister must therefore rely upon the float operated fuel vapor vent valve in the tank to shut off the vent line when the fuel level has reached the top of the tank causing liquid to back up into the filler neck and shut off the nozzle. Such float operated vent valves are critical in their calibration in order to provide proper vapor venting as fuel is introduced into the tank and also must reliably close in the event of vehicle rollover. Heretofore, both of these latter requirements have been the source of problems in vehicle service for such float operated valves.

The type of system employing a vapor recirculation vent tube directly from the tank top to the upper end of the filler tube relies upon the liquid fuel covering the end of the tube through the top of the tank in order to starve vapor recirculation to the upper end of the filler tube thereby creating a vacuum for nozzle shutoff.

Referring to FIG. 4, a known system is illustrated wherein the fuel tank 1 has a float operated vent valve 2 mounted in the upper wall of the tank with the vent outlet thereof connected to the inlet of an electrically operated purge valve 3 which is controlled by an electronic controller or ECU 4. The outlet of the vent valve 2 is also connected to the inlet of a storage reservoir or canister 5. A recirculation port 6 in the upper end 7 of a filler tube 8 is provided for fuel vapor recirculation to the upper end of the filler tube during refueling by the nozzle discharging into the filler tube.

A recirculation vent line 10 is connected to the top of the tank to provide fuel vapor recirculation to the port 6 in the upper end of the fill tube 7 during refueling independently of the float operated vent valve 2 in which case a separate rollover spill protection valve 11 may be employed. In this latter arrangement the end of the tube extends through the upper tank wall to the desired level for having the liquid fuel close the end of the tube and terminate vapor recirculation to the fill tube end 7 when the fuel reaches a predetermined level. Typically, the recirculation line 10 must be routed along the top of the tank over the edge and along the filler to facilitate installation in the vehicle.

In the prior art system requiring a separate vent tube from the tank top to the upper filler neck, careful placement of the end of the vent tube in the tank is required to effect closing of the end of the vent tube at the desired fuel level in order to prevent liquid fuel backup in the filler tube. Furthermore, the routing of the recirculation line creates a liquid trap in the line, which can block recirculation and cause undesired vacuum in the filler tube during refueling and activation of the automatic nozzle shutoff.

Accordingly, it has been desired to provide a more positive way or means of cutting off vapor vent recirculation to the upper end of the filler tube during refueling when the liquid fuel level has risen to the desired full position.

BRIEF SUMMARY OF THE INVENTION

The present invention provides for an electrically operated shutoff valve in the fuel vapor vent recirculation line to the upper end of tank filler tube. The electrically operated valve is controlled by an electronic controller responsive to a signal from a sensor in the tank which may comprise either a thermistor or a signal from the existing fuel level indicator or sender. The present invention thus provides a positive shutoff of fuel vapor to the upper end of the filler tube during refueling and eliminates the necessity for accurately locating the end of the recirculation tube in the tank and the occurrence of liquid being trapped in the recirculation line.

DETAILED DESCRIPTION OF THE INVENTION

Figure 1:
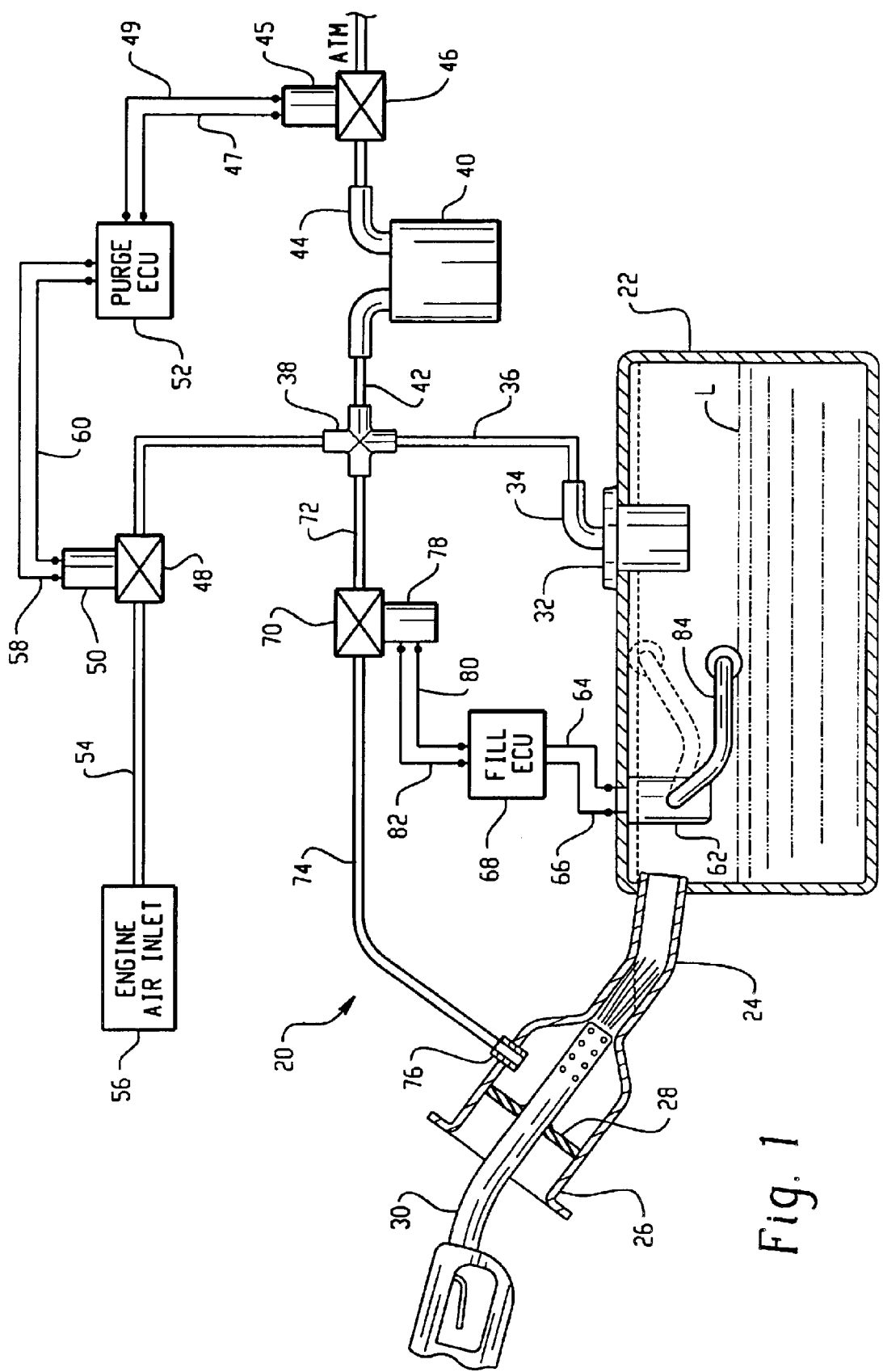
FIG. 1 is a pictorial schematic of a fuel tank vent system employing the present invention.

Referring to FIG. 1, the system of the present invention is indicated generally at 20 and is illustrated as connected to a vehicle fuel tank 22 having liquid fuel therein at a level L. A filler tube 24 is provided with its lower end connected through the wall of tank 22 and with its upper end 26 enlarged and having therein a flexible seal 28 for sealing about a refueling nozzle 30 such as the type having a vacuum operated shutoff (not shown) when same is received therein.

In the embodiment of FIG. 1 the tank has a float operated vapor vent valve 32 of the type well known in the art and attached through the upper wall of the tank with the outlet 34 thereof connected along line 36 to a common manifold or connector 38 which has one outlet connected through line 42 to the inlet of a storage reservoir or canister 40 which may be filled with adsorbent granulated carbonaceous material such as charcoal as is known in the art.

Canister 40 also is connected through an inlet fitting 44 to the outlet of valve 46 operated by solenoid 45, admitting atmospheric purge air upon a vacuum being drawn in the canister 40. The manifold or fitting 38 also has another outlet connected to the inlet of a purge flow control means, which in the present embodiment comprises valve 48 operated by a solenoid 50 controlled by an electronic controller or Purge ECU 52 for providing purge flow to its outlet and along line 54 to the air inlet of an engine denoted by reference numeral 56. Solenoid 50 is electrically connected by leads 58, 60 to the controller or purge ECU 52. It will be understood, however, that other flow control means may be employed, as for example, a pressure responsive valve or a pump or other flow control device. Atmospheric valve 46 has its actuating solenoid 45 connected by leads 47, 49 to ECU 52 which thus also controls flow of atmospheric air to the canister.

In the embodiment of FIG. 1, tank 22 has a float operated signaling device or sender 62 disposed therein which is connected by leads 64, 66 extending through the upper wall of the tank to an electronic controller or ECU 68.

A vapor recirculation valve 70 has its inlet connected to another outlet of manifold 38 along line 72; and, the outlet of valve 70 is connected through line 74 to the vapor recirculation port 76 provided in the upper end 26 of the filler tube below the seal 28. Valve 70 is actuated by a solenoid 78 connected by leads 80, 82 to receive a control signal from the Fill ECU 68.

In operation of the embodiment of FIG. 1, when the fuel level rises in the tank to the level indicated in dashed outline, the float arm 84 of sender 62 is raised causing the sender to send the signal to ECU 68 which energizes solenoid 78 to close valve 70 and as shown in FIG. 1 block all further vapor recirculation to the upper end 26 of the filler tube. When the valve 70 is closed, continuing discharge of fuel from nozzle 30 creates a vacuum within the upper end of the filler tube 26 below the seal 28 and causes actuation of the unknown device in the nozzle 30 to cause automatic shut off. It will be understood that in the embodiment of FIG. 1, if the float operated vent valve 32 closes the vent line 36 before sender 62 sends a tank full signal to ECU 68, the vapor flow to the circulation line 74 and the canister line 42 will be shut off.

Figure 2:
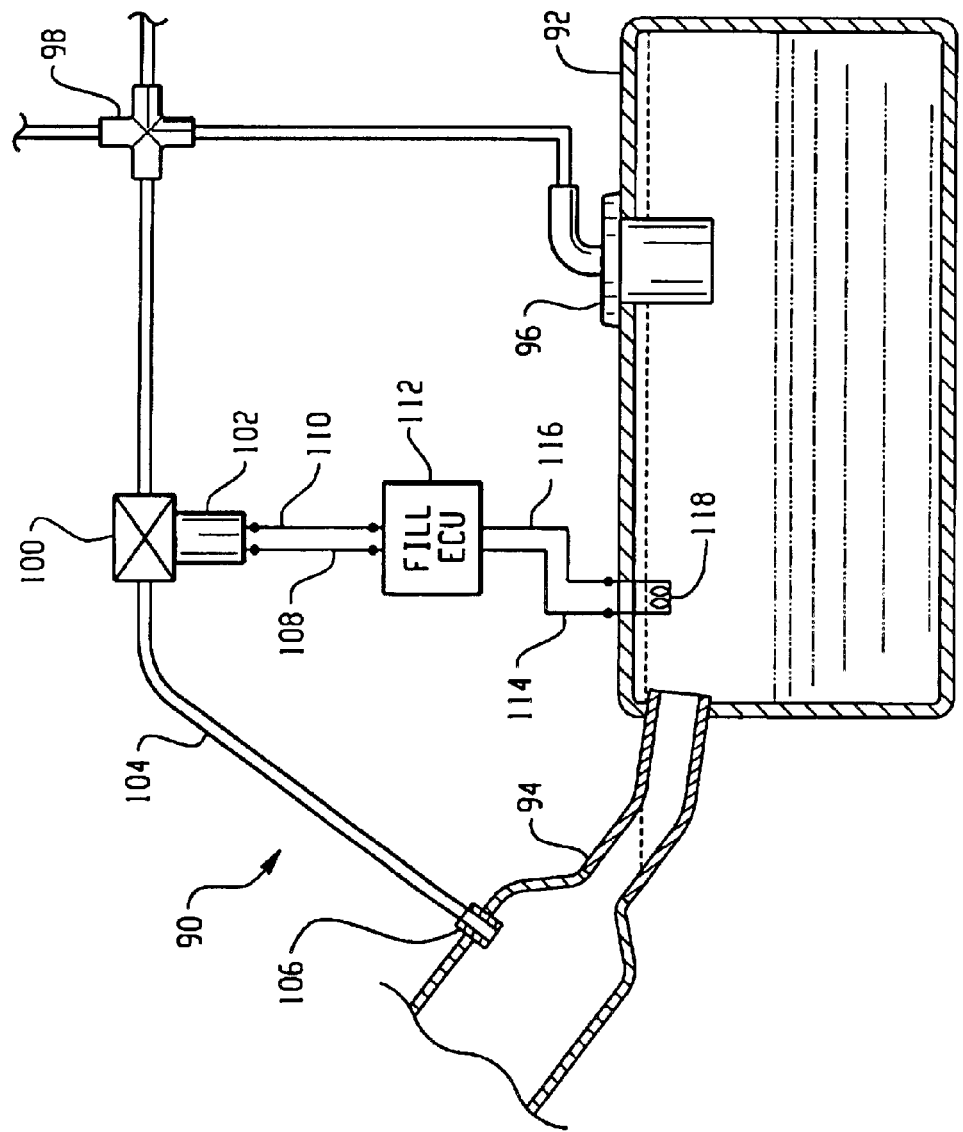
FIG. 2 is a view of a portion of the system of FIG. 1 showing an alternate embodiment of the present invention.

Referring to FIG. 2, an alternate embodiment of the invention is indicated generally at 90 in which the tank 92 has a filler tube 94 with a float operated vent valve 96 connected to provide vapor to a manifold 98 which has one outlet connected to the inlet of a recirculation shutoff valve 100 operated by solenoid 102 with the outlet of the valve connected along line 104 to the recirculation port 106 provided in the filler tube 94. The solenoid 102 is connected along lines 108, 110 to an electronic controller or fill ECU 112 which is connected along leads 114, 116 through the top of the tank 92 to a thermistor 118 disposed in the tank adjacent the undersurface of the tank upper wall.

In operation, the system 90 of FIG. 2 can shut off the flow of fuel vapor to the recirculation line 104 either by float operated vent valve 96 or by thermistor 118 sending a signal to ECU 112 which energizes solenoid 102 and closes valve 100 thereby blocking all recirculation of vapor to the filler tube upper end. It will be understood that the remainder of the system 90 of FIG. 2 although not illustrated as identical to that of the embodiment of FIG. 1.

Figure 3:
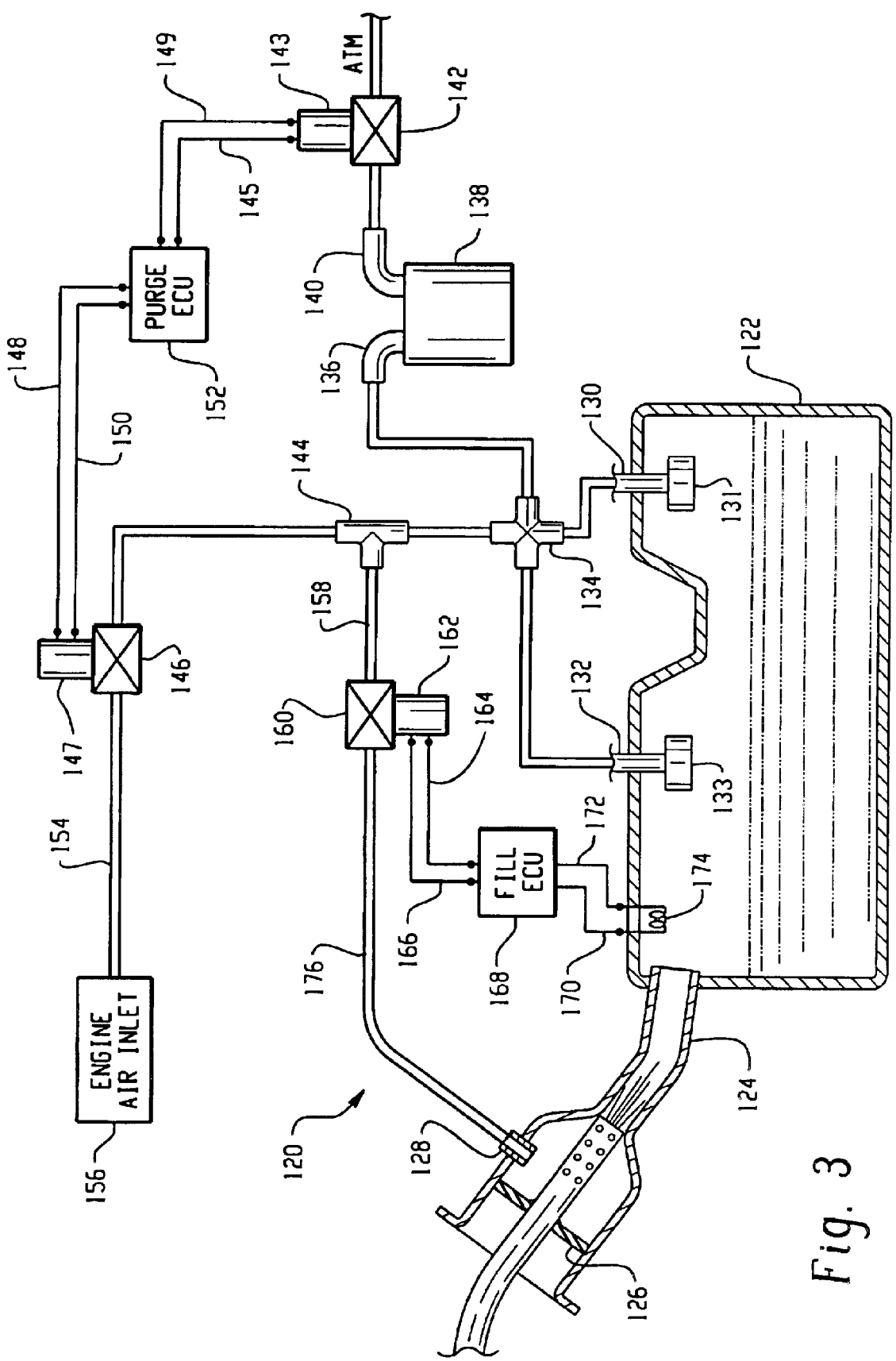
FIG. 3 is another embodiment of the present invention.
Figure 4:
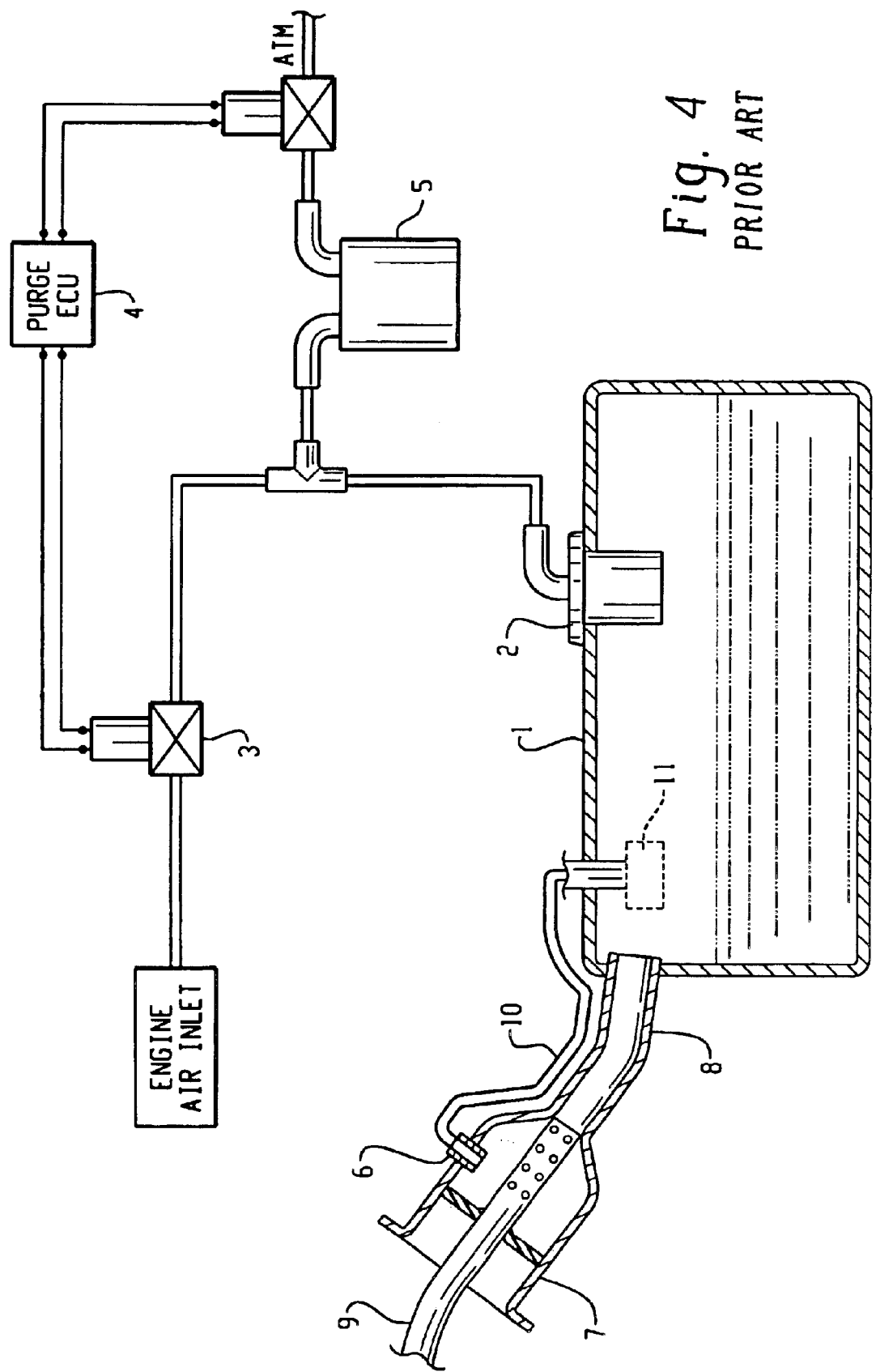
FIG. 4 is a schematic of the fuel vapor vent systems of the prior art.

Referring to FIG. 3, another embodiment of the invention is indicated generally at 120 wherein tank 122 has a filler tube 124 with the upper end thereof having a nozzle seal 126 therein and a vapor recirculation port 128. The upper wall of the tank is of the multilevel type employed for accommodating vehicle structural members and has separate vent tubes 130, 132 provided at the plurality of locations of the highest level or vapor domes. Tubes 130, 132 are connected to a manifold or connector 134 which is connected to the inlet 136 of a storage canister 138 with an atmospheric inlet 140 connected to a valve 142 operated by a solenoid 143 connected to ECU 152 by leads 145, 149. If desired or required rollover spill protection valves 131, 133 may be provided on the ends of tubes 130, 132 in the tank.

Manifold 134 is also connected to a Tee 144 which is connected to a solenoid operated purge valve 146 which has its solenoid 147 connected via leads 148, 150 to an electronic controller or purge ECU 152. The outlet of valve 146 is connected along line 154 to the air inlet 156 of the vehicle engine.

Tee 144 also provides a flow of fuel vapor along line 158 to the inlet of a shutoff valve 160 operated by the solenoid 162 which is connected by leads 164, 166 to an electronic control unit or fill ECU 168. ECU 168 is connected by leads 170, 172 through the top wall of the tank to a thermistor 174 disposed within the tank and adjacent the upper wall thereof. The outlet of shutoff valve 160 is connected to the vapor recirculation port 128 in the upper end of the fill tube 124.

The system of FIG. 3 eliminates the need for a float operated vent valve and provides for vapor venting of the domes of the tank through the tubes 130, 132. The thermistor 174 senses the rising fuel level and signals ECU 168 to energize solenoid 166 and close shutoff valve 160 thereby stopping all recirculation of vapor through line 176, whereupon, nozzle discharge creates a vacuum within the upper end of the tube which automatically shuts off the nozzle.

The present invention thus provides an electrically operated valve for shutting off all flow of fuel vapor recirculated to the upper end of the filler tube for creating a vacuum to effect nozzle shutoff. The present invention can be utilized to provide an alternative or redundancy to a float operated fuel vapor vent valve in the tank or can be installed without the need for a float operated vent valve.

Although the invention has hereinabove been described with respect to the illustrated embodiments, it will be understood that the invention is capable of modification and variation and is limited only by the following claims.

What is claimed is:

1. A vapor emission control system for an engine fuel tank having a filler tube with an upper end for receiving a refueling nozzle comprising:
   (a) a fuel level indicator in said tank operable to provide an electrical fill limit signal indicative of a predetermined level of fuel in the tank;
   (b) a fill controller operable to provide an electrical shut off signal upon receipt of said electrical fill limit signal at said determined level;
   (c) a storage reservoir connected for receiving fuel vapor from the tank;
   (d) purge flow control means connected for controlling flow of vapor from said reservoir to an air inlet of the engine;
   (e) a flexible seal disposed in said filler tube upper end for sealing about said nozzle when same is received therein; and,
   (f) an electrically operated recirculation valve operatively connected for controlling vapor flow from the tank to the upper end of the fill tube and operative upon receipt of said shut-off signal for blocking all vapor flow to the upper end of the filler tube, wherein discharge from the nozzle creates a vacuum in the upper end thereby activating an automatic nozzle shut off.

2. The system defined in claim 1, wherein said fuel level indicator includes a float operated device.

3. The system defined in claim 1, wherein said fuel level indicator includes a thermistor.

4. The device defined in claim 1, wherein said shut-off valve is solenoid operated.

5. The system defined in claim 1, further comprising an electronic purge controller operative to energize said purge valve in response to engine operating parameters.

6. The system defined in claim 1, wherein said purge flow control means includes an electrically operated valve.

7. A vapor emission control system for an engine fuel tank having a filler tube with an upper end for receiving a refueling nozzle comprising:
   (a) a fuel level indicator in said tank operable to provide an electrical fill limit signal indicative of a predetermined level of fuel in the tank;

(b) a fill controller operable to provide an electrical shut off signal upon receipt of said electrical fill limit signal at said determined level;

(c) a storage reservoir connected for receiving fuel vapor from the tank;

(d) purge flow control means connected for controlling flow of vapor from said reservoir to an air inlet of the engine;

(e) an electrically operated recirculation valve operatively connected for controlling vapor flow from the tank to the upper end of the fill tube and operative upon receipt of said shut-off signal for blocking vapor flow to the upper end of the filler tube, wherein discharge from the nozzle creates a vacuum in the upper end thereby activating an automatic nozzle shut off; and, (f) a float operated vent valve connected for supplying vapor to said reservoir, said shut-off valve and said purge valve.

8. A method of controlling vapor emission from a vehicle engine fuel tank having a filler tube with an upper end for receiving a refueling nozzle comprising:

(a) connecting a fuel vapor reservoir to the tank and connecting a means for controlling flow of fuel vapor from the tank to the vehicle engine air inlet;

(b) disposing a recirculation valve and blocking all vapor flow from the tank to the filler tube upper end through the recirculation valve in response to signal from an electronic controller;

(c) disposing a fuel level indicator in the tank and providing an electrical signal when the tank is full and closing said recirculation valve in response to said electrical signal; and, (d) disposing a flexible seal in said upper end and sealing about the nozzle when same is received therein.

9. The method defined in claim 8, wherein said step of disposing a fuel level indicator includes disposing a float operated device in the tank.

10. The method defined in claim 8, wherein said step of disposing a fuel level indicator includes disposing a thermistor in the tank.

11. The method defined in claim 8, wherein said step of closing said recirculation valve includes discharging fuel from the nozzle and creating a vacuum in said filler tube upper end and activating an automatic nozzle shut-off.

12. The method defined in claim 8, wherein said step of connecting a means for controlling flow from the tank to the engine air inlet includes connecting an electrically operated valve.

* * * * *